United States Patent
Choi et al.

(10) Patent No.: US 7,961,754 B2
(45) Date of Patent: Jun. 14, 2011

(54) APPARATUS AND METHOD FOR MULTIMEDIA DATA TRANSMISSION AND RECEPTION IN CABLE NETWORK USING BROADBAND AND PHYSICAL LAYER FRAME STRUCTURE

(75) Inventors: Dong-Joon Choi, Daejon (KR); O-Hyung Kwon, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 959 days.

(21) Appl. No.: 11/493,418

(22) Filed: Jul. 26, 2006

(65) Prior Publication Data

US 2007/0058680 A1    Mar. 15, 2007

(30) Foreign Application Priority Data

Jul. 26, 2005  (KR) ................. 10-2005-0067835
Dec. 15, 2005  (KR) ................. 10-2005-0123814

(51) Int. Cl.
  *H04J 3/16*   (2006.01)
  *H04J 3/22*   (2006.01)
  *H04J 1/00*   (2006.01)
(52) U.S. Cl. ......... 370/465; 370/466; 370/467; 370/480
(58) Field of Classification Search .............. 370/390, 370/420, 432, 400–401, 465–467, 480; 398/26
  See application file for complete search history.

(56) References Cited

U.S. PATENT DOCUMENTS

| | | | |
|---|---|---|---|
| 6,751,230 B1 * | 6/2004 | Vogel et al. | 370/432 |
| 7,203,227 B1 * | 4/2007 | Currivan et al. | 375/222 |
| 7,275,115 B2 * | 9/2007 | Bunn et al. | 709/247 |
| 7,584,498 B2 * | 9/2009 | Amshoff et al. | 725/126 |
| 2002/0046406 A1 * | 4/2002 | Chelehmal et al. | 725/87 |
| 2002/0122430 A1 * | 9/2002 | Haberman et al. | 370/429 |
| 2002/0131426 A1 * | 9/2002 | Amit et al. | 370/401 |
| 2003/0058893 A1 * | 3/2003 | Dworkin et al. | 370/503 |
| 2003/0069002 A1 * | 4/2003 | Hunter et al. | 455/404 |

(Continued)

FOREIGN PATENT DOCUMENTS

JP    2001-044956 A    2/2001

(Continued)

OTHER PUBLICATIONS

Alberto Morello, et al; "DVB-S2-ready for lift off", EBU Technical review, No. 300, pp. 1-10, Oct. 2004.

*Primary Examiner* — Chi H Pham
*Assistant Examiner* — Farah Faroul
(74) *Attorney, Agent, or Firm* — Ladas & Parry LLP

(57) ABSTRACT

Provided are an apparatus and a method for multimedia data transmission in a cable network using a broadband and physical layer frame structure. The apparatus includes an external network matching module for transmitting data inputted/outputted from/to an external network to a Data Over Cable Service Interface Specification (DOCSIS) Media Access Control (MAC) layer, a DOCSIS MAC processor for transmitting the data from the external network matching module to a corresponding destination, a first downstream physical layer processor for handling an existing standard transmission in the data from the DOCSIS MAC processor, a second downstream physical layer processor for dealing with a new broadband transmission in the data from the DOCSIS MAC processor, and an upstream physical layer processor for providing received data to the DOCSIS MAC processor.

22 Claims, 13 Drawing Sheets

U.S. PATENT DOCUMENTS

| | | |
|---|---|---|
| 2004/0163129 A1 | 8/2004 | Chapman et al. |
| 2004/0208121 A1* | 10/2004 | Gin et al. .................. 370/230 |
| 2004/0218606 A1 | 11/2004 | Leatherbury et al. |
| 2004/0244043 A1 | 12/2004 | Lind et al. |
| 2006/0120282 A1* | 6/2006 | Carlson et al. ............. 370/229 |
| 2007/0195824 A9* | 8/2007 | Chapman et al. ........... 370/490 |
| 2008/0170853 A1* | 7/2008 | Rakib et al. ................ 398/26 |
| 2008/0316954 A1* | 12/2008 | Zheng ........................ 370/315 |

FOREIGN PATENT DOCUMENTS

| | | |
|---|---|---|
| KR | 1020050009350 A | 1/2005 |
| KR | 1020050074211 A | 7/2005 |
| KR | 1020050076409 A | 7/2005 |
| WO | 01/47208 A2 | 6/2001 |

* cited by examiner

APPARATUS AND METHOD FOR MULTIMEDIA DATA TRANSMISSION AND RECEPTION IN CABLE NETWORK USING BROADBAND AND PHYSICAL LAYER FRAME STRUCTURE

FIELD OF THE INVENTION

The present invention relates to a multimedia data transmission system; and more particularly, to an apparatus and method for multimedia data transmission and reception in a cable network using a broadband and physical layer frame structure which uses a broadband channel enabling a high speed data transmission and can easily employ new transmission technologies of modulation and demodulation, channel codec and so on.

DESCRIPTION OF RELATED ART

Currently, data is being transmitted over cable network. For this data transmission, there have been widely used Cable Modem Termination System (CMTS) and Cable Modem (CM) which are based on Data Over Cable Service Interface Specification (DOCSIS) 1.0, 1.1 and 2.0 standard.

Under the current DOCSIS standard, available RF bandwidth for transmission is limited to 6 MHz in case of downstream. In other words, the CM is allowed to receive data via a single 6 MHz band and its maximum transmission rate is about 40 Mbps. But, with the advent of various types of services into which communications and broadcasting are converged, there is a limit to the current standard in the service providing capability and efficiency aspects.

The DOCSIS downstream transmission standard was developed in the beginning of the 1990's. Thereafter, due to improvement of hardware performance with the advent of new technologies, the introduction of new physical layer has been accepted to be easy in introducing new services and also to be effective in providing existing services. But, the first consideration for introduction of new technologies is that the existing services or new services within the permissible limit should be allowed by existing cable service subscribers, without any problems that may occur owing to introduction of new technologies. Namely, in order to do so, the structure should be the one that can support backward compatibility.

In addition, there may be involved various types of CMs together within a same cell according to the advance of cable transmission technologies. The various types of CMs imply that they have reception capabilities of CMs that can support new standard when transmission method using cable network is newly standardized with the advance of technologies, or employ different optimal transmission methods that comply with different reception environments of CMs in a same cable transmission company. In case where an additional transmission band is assigned to each group of CMs to provide a transmission method that is compatible with each CM group by taking account of newly developed transmission standard and environments, there is a limitation to the frequency resources that can be used in the cable network. Further, in case where compatibility is required as a compulsory matter in the new standard in the future, a new receiver has a drawback in that it needs an extra cost for implementation of a physical layer to receive the existing bands.

To solve the above problems, there have been made since the year 2000 a variety of attempts such as a change of modulation and demodulation method, an introduction of high efficient channel coding scheme and a change of transmission structure. However, it is the current situation that no method is converged as a definite alternative scheme.

SUMMARY OF THE INVENTION

It is, therefore, a primary object of the present invention to provide an apparatus and method for multimedia data transmission and reception in a cable network using a broadband and physical layer frame structure which uses a broadband channel that enables a high speed data transmission and can easily employ new transmission technologies of modulation and demodulation, channel codec and so on. Specifically, the present invention provides backward compatibility to allow existing cable modems to receive existing services from new cable transmission system and also facilitates new introduction of large-capacity data transmission services into which new communications and broadcasting to be appeared in the future are converged and new transmission technologies.

In accordance with one aspect of the present invention, there is provided an apparatus for multimedia data transmission in a cable network using a broadband and physical layer frame structure, including: an external network matching module for transmitting data inputted/outputted from/to an external network to a DOCSIS) MAC layer; a DOCSIS MAC processor for transmitting the data from the external network matching module to a corresponding destination; a first downstream physical layer processor for handling an existing standard transmission in the data from the DOCSIS MAC processor; a second downstream physical layer processor for dealing with a new broadband transmission in the data from the DOCSIS MAC processor; and an upstream physical layer processor for providing received data to the DOCSIS MAC processor.

In accordance with another aspect of the present invention, there is provided an apparatus for multimedia data reception in a cable network using a broadband and physical layer frame structure, including: a first downstream physical layer receiver for handling an existing physical layer scheme; a second downstream physical layer receiver for dealing with a broadband physical layer scheme; a DOCSIS MAC processor for processing data received by the first and the second downstream physical layer receivers; and an upstream physical layer transmitting module for transmitting the data.

In accordance with still another aspect of the present invention, there is provided a method for multimedia data transmission in a cable network using a broadband and physical layer frame structure, including the steps of: (a) extracting a packet inputted from an eternal network or an internal server and an Ethernet frame from an external network matching module, constructing a DOCSIS MAC frame using the extracted ones, and storing the DOCSIS MAC frame in a DOCSIS MAC frame buffer, (b) classifying the DOCSIS MAC frame stored in the step (a) into an existing service channel or a broadband transmission channel by referring to a reception information table received from registered information between a CM and a CMTS during the initialization of the CM depending on an address of transmission destination; (c) classifying the frame classified into the broadband transmission channel in the step (b) based on a physical layer transmission mode designated in each CM, mapping the DOCSIS MAC packet classified into the broadband channel transmission to an MPEG-2 transmission stream, and storing the mapped data in an MPEG-2 transmission stream buffer of each transmission mode; (d) mapping the MAC frame that transmits the packet or management message classified into the existing service band in the step (b) to an MPEG-2 transmission stream like an existing DOCSIS 1.x/2.0, and storing the mapped data in an MPEG-2 transmission stream buffer for sending to the existing service band; (e) transmitting the packet stored in the step (c) depending on an operation mode and a band allocation policy of a predetermined physical layer frame based transmission structure at a transmission controller, and modulating the packet at a physical layer frame based modulator, and (f) modulating the packet stored in the step (d).

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description associated with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
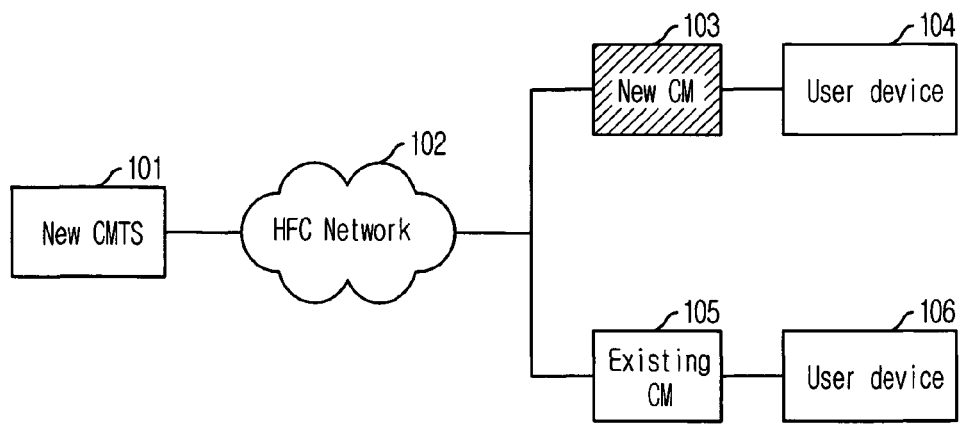
FIG. 1 is a view for explaining an apparatus for multimedia data transmission and reception in a cable network using a broadband and physical layer frame structure in accordance with an embodiment of the present invention.

FIG. 1 is a view for explaining an apparatus for multimedia data transmission and reception in a cable network using a broadband and physical layer frame structure in accordance with an embodiment of the present invention. In particular, there is presented in FIG. 1 a conceptual view for transmission using Hybrid Fiber Coax (HFC) when a new transmission method is introduced.

The basic concept of the apparatus for multimedia data transmission and reception using the broadband and physical layer frame structure in accordance with the present invention is that a newly defined broadband signal is transmitted simultaneously with a downstream physical layer signal that is based on DOCSIS 2.0 to provide existing services.

A CMTS is a system that selects a channel to be transmitted from a basic physical layer transmission channel that complies with ITU-T J.83 Annex B and a new physical layer channel of broadband structure according to whether to support the broadband transmission of CM at a Media Access Control (MAC) layer and then transmits data. Therefore, CM used by the existing user can receive services through a physical layer that is based on the existing standard, while new CM can take services through all of the existing physical layer and the new physical layer. In addition, the transmission for new broadband is made in the form that is harmonized with the new standard or various optimal reception environments using a physical layer frame based downstream transmission structure.

When a new transmission method is adopted to provide a new service with the existing service or for more efficient transmission using a HFC 102, there is required installation of a CMTS 101 that supports the new transmission method and a new CM 103. But, the CMs 103 and 105 at a subscriber stage that correspond to the new CMTS 101 includes the CM 103 that supports the new standard or scheme and the CM 105 that supports only the existing standard. At this time, a user without the new CM 103 should receive the service, which the user has being received through the existing CM 105, without any restriction. Further, the new service should be also provided to the existing user within the allowed performance range of the existing CM. Namely, backward compatibility should be provided.

Figure 2:
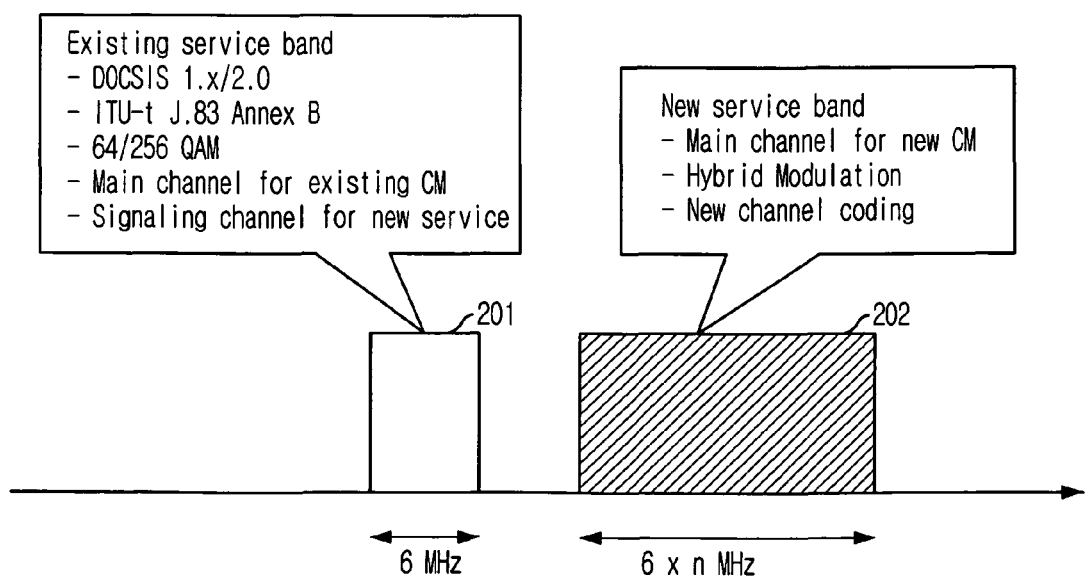
FIG. 2 is a view for describing an example of channel bands used in an apparatus for multimedia data transmission and reception in accordance with an embodiment of the present invention.

FIG. 2 is a view for describing one example of channel bands used in an apparatus for multimedia data transmission and reception in accordance with the present invention wherein there is shown a construction of DOCSIS 1.x/2.0 and additional broadband downstream transmission bands for broadband channel transmission structure.

The basic concept of the transmission structure using the broadband channel is that it simultaneously employs a downstream physical layer 201 that is based on DOCSIS 1.x/2.0 to provide the existing services and a newly defined broadband physical layer 202. At this time, the CMTS is a system that selects a channel to be transmitted from the basic physical layer transmission channel 201 that complies with ITU-T J.83 Annex B and the new physical layer channel 202 of broadband structure according to whether to support the broadband transmission of CM in a MAC layer and then transmits data to the CM. In other words, the existing CM can receive services through a physical layer that is based on the existing standard, while the new CM can take services through both of the existing physical layer and the new physical layer.

The existing services can be provided to users with the existing CM via the existing physical layer and the existing channel and also the new services to the users within the transmission capability range of the existing physical layer.

Various types of services with the transmission efficiency and capability of the new physical layer can be offered to users with the new CM.

The existing downstream service band 201 is a band assigned in the unit of 6 MHz, which is based on ITU-T J.83 Annex B defined by DOCSIS standard. Through this band, a management message is sent to set whether to provide a new downstream service.

In case of newly added broadband, a predetermined broadband can be allocated so that an operator can use channels more efficiently without limit of existing 6 MHz band. Through the allocated broadband, a variety of services such as Video On Demand (VOD), high speed data transmission, etc., which were unavailable within 6 MHz band, can be effectively provided. At this time, there may be a convenience in view of operation for bandwidth of broadband to be allocated to multiple of 6 MHz, but it does not need to do so necessarily. For signals sent via the broadband, there can be adopted and used new physical layer transmission technologies such as 1024 Quadrature Amplitude Modulation (QAM), Low Density Parity Check (LDPC), hybrid modulation and demodulation, etc.

Figure 3:
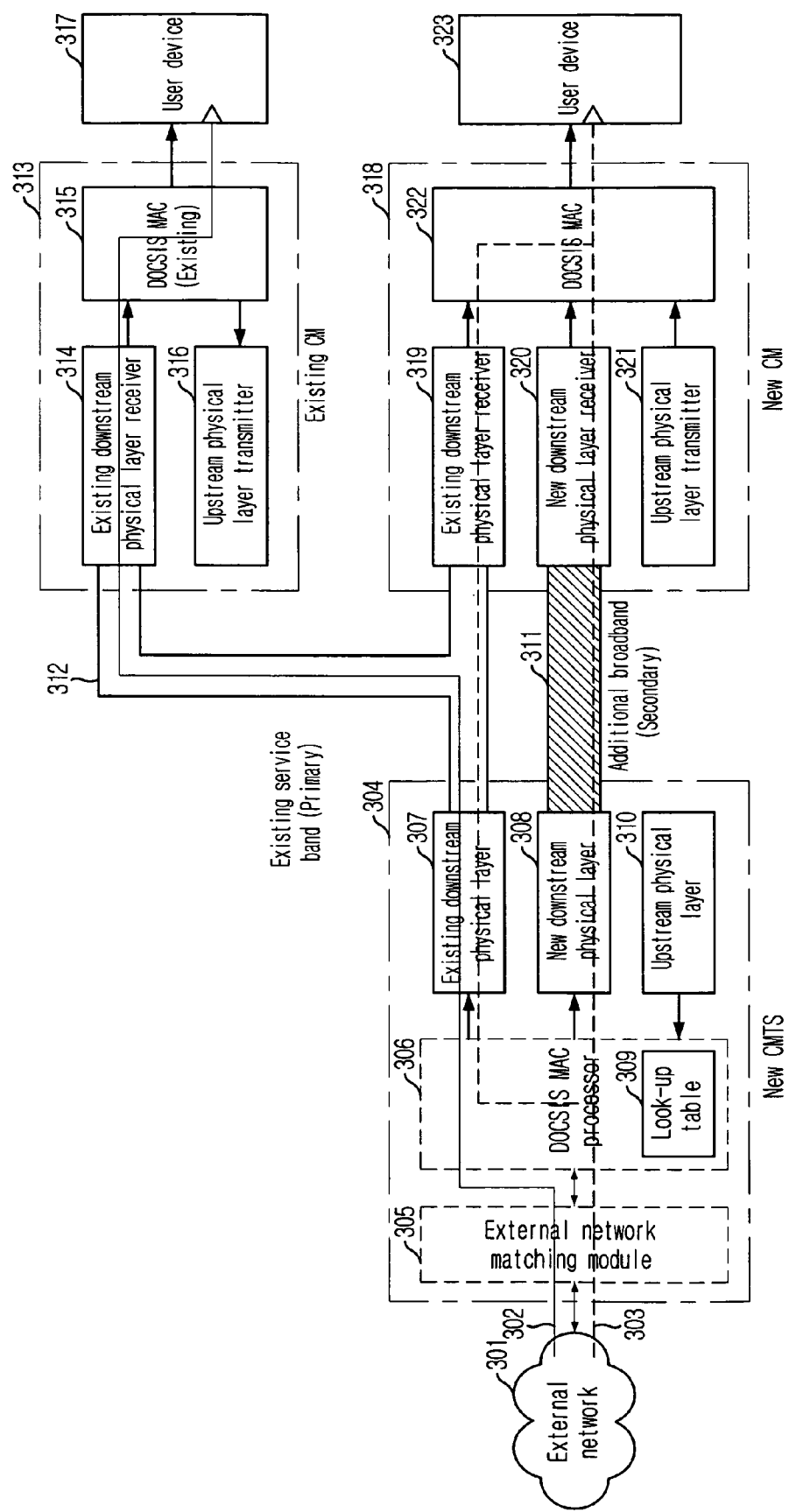
FIG. 3 is a block diagram exemplifying a configuration of an apparatus for multimedia data transmission and reception in accordance with an embodiment of the present invention.

FIG. 3 is a block diagram exemplifying a configuration of an apparatus for multimedia data transmission and reception in accordance with an embodiment of the present invention, wherein description is given on the concept of the transmission and reception for additional broadband channel transmission structure.

The inventive apparatus for multimedia data transmission and reception using an existing service band (primary) 312 and an additional broadband (secondary) 311 includes a new CMTS 304 that supports both an existing downstream physical layer and a new broadband downstream physical layer, a new CM 318 that performs the same function as that of the new CMTS 304, and an existing CM 313 that supports only the existing downstream physical layer.

As shown in FIG. 3, the CMTS 304 that supports the new broadband scheme includes an external network matching module 305 for transmitting data inputted/outputted from/to an external network to a DOCSIS MAC layer, a DOCSIS MAC processor 306 for providing the data from the external network matching module 305 to a corresponding destination, a downstream physical layer unit 307 for dealing with transmission of existing standard data in the data from the DOCSIS MAC processor 306, a new downstream physical layer unit 308 for treating transmission of new broadband data in the data from the DOCSIS MAC processor 306, and an upstream physical layer 310 for transmitting received data to the DOCSIS MAC processor 306.

More specifically, the external network matching module 305 carries out a function of sending data inputted/outputted from/to the external network of IP backbone network, VOD server or the like to the DOCSIS MAC layer.

The DOCSIS MAC processor 306 of the CMTS 304 performs a function that can support the downstream broadband physical layer, in addition to the existing DOCSIS MAC process function. For the above purpose, when it is intended to send data received from the external network or service providing device within headend, the processor 306 sends user data and management message data using the existing downstream physical layer unit 307 if its destination is the existing CM 313, and all user data using the new downstream physical layer unit 308 via the broadband 311 if its destination is the new CM 318.

As for the management message between the CMTS 304 and the CMs 313 and 318 except for the user data sent to the new CM 318, the CMTS 304 and the DOCSIS MAC processor 306 send the same using the existing downstream physical layer unit 307, or send to all of the unit 307 and the new downstream physical layer unit 308.

The reason of sending the user data and management message data separately when sending the management message using the existing downstream physical layer unit 307 is because the amount of management data to be sent is small compared to the user data and the efficient process of management messages is possible by sending all management messages between the CMTS 304 and the CMs 313 and 318 via a single physical layer. In addition, in case where the management message is to be sent to all of the existing downstream physical layer unit 307 and the new downstream physical layer unit 308, one merit is that the existing band may not be used when the existing CM 313 is all upgraded to the new CM 318.

Differently from the management data, the user data is sent via a single physical layer and transmission band designated by the CMTS 304 and the DOCSIS MAC processor 306 according to destinations of the CMs 313 and 318. Therefore, it doesn't need to send the user data separately via two channels, so that no separation and recombination of the user data are required which renders the process at the MAC layer of the CMs 313 and 318 simplified.

The new CM 318 that can support the broadband is composed of an existing downstream physical layer receiver 319 that can deal with an existing physical layer scheme, a new downstream physical layer receiver 320 that can treat a broadband physical layer, a DOCSIS MAC processor 322, and an upstream physical layer transmitter 321.

To be more specific, the DOCSIS MAC processor 322 of the new CM 318 can process data sent from the existing physical layer and also data from the new broadband physical layer.

As mentioned above, in case where the management message sent to the new CM 318 is also simultaneously sent to the broadband transmission channel, the signal may not be sent to the existing service band 312 any longer when the existing CM 313 is all upgraded to the new CM 318 later. But, the band for the existing standard of the existing service band 312, even after the existing CM 313 is all upgraded, can be used as an exclusive channel for management and signaling, together with data sent to the user over entire HFC, including backward compatibility.

In the current cable network, there exists an extra signaling channel of Out Of Band (OOB) or DOCSIS Settop Gateway (DSG) type for digital broadcasting services. And, in case of the DOCSIS channel, the management message is sent over each downstream channel. But, it may be more efficient to provide services into which broadcasting and communications are converged that all signaling data is sent over a single exclusive channel and then processed by a terminal, rather than sending management and signaling data over separate channels for all services.

Figure 4:
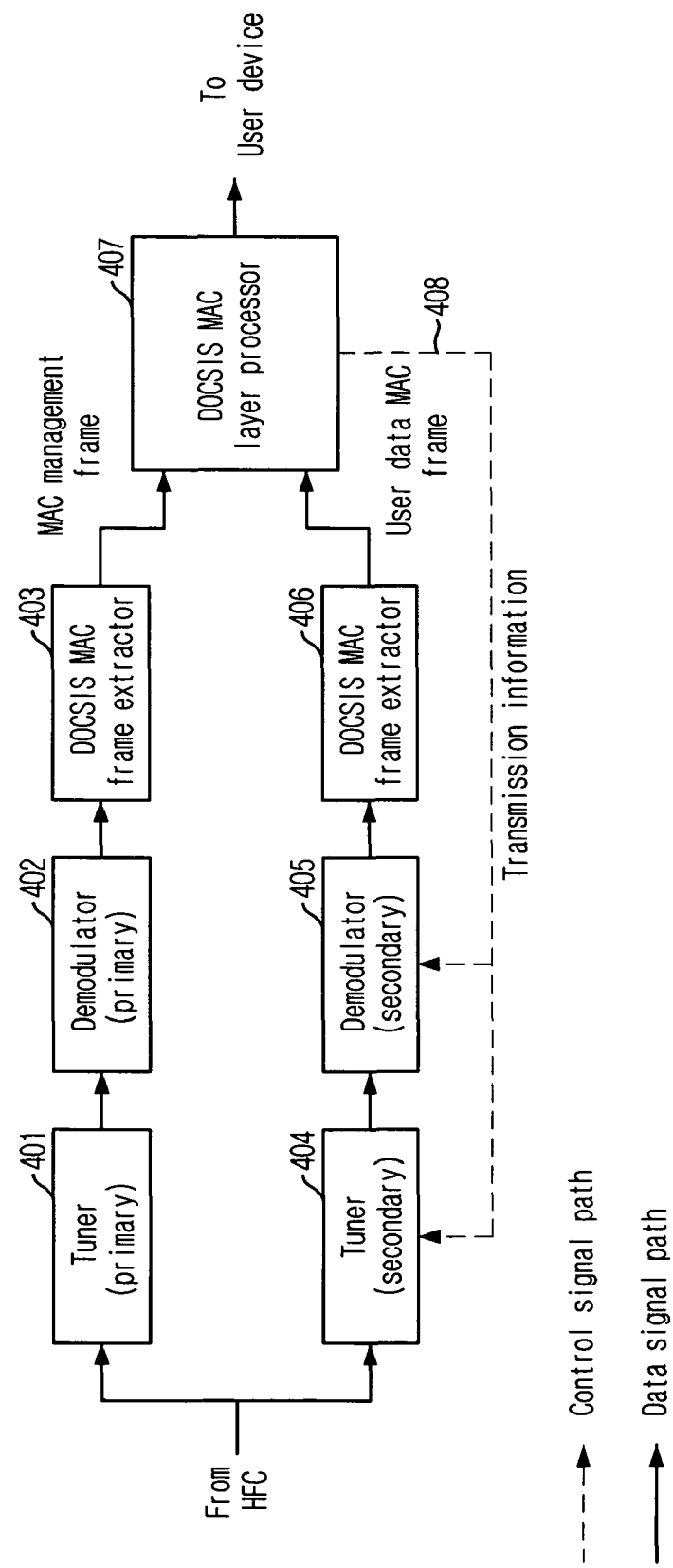
FIG. 4 is a block diagram illustrating a configuration of an apparatus for multimedia data reception in accordance with an embodiment of the present invention.

FIG. 4 is a block diagram illustrating a configuration of an apparatus for multimedia data reception in accordance with an embodiment of the present invention.

As shown therein, the multimedia data receiving apparatus of the invention includes a physical layer module consisting of a tuner 401 for receiving an existing service band signal, a demodulator 402, etc., a physical layer module consisting of a tuner 402 for receiving all of new broadband signals, a demodulator 405, etc., MAC frame extractors 403 and 406 for extracting DOCSIS MAC frames from MPEG-2 transmission streams, and a DOCSIS MAC layer processor 407.

Signals demodulated from the existing service band and the new broadband service band by the demodulators 402 and 405 are provided in the form of MPEG-2 transmission streams. And then, DOCSIS MAC frames are detected from the MPEG-2 transmission streams by the MAC frame extractors 403 and 406 and then delivered to the DOCSIS MAC processor 407.

The receiving apparatus of the present invention initially acquires information on the additional broadband channel from the existing service band. Based on the acquired information on the broadband channel, the receiving apparatus judges whether or not the broadband channel is available; and sets pattern information 408 of the tuner 404 and the demodulator 405 for the new service band if available and then receives the user data over the broadband channel.

Figure 5:
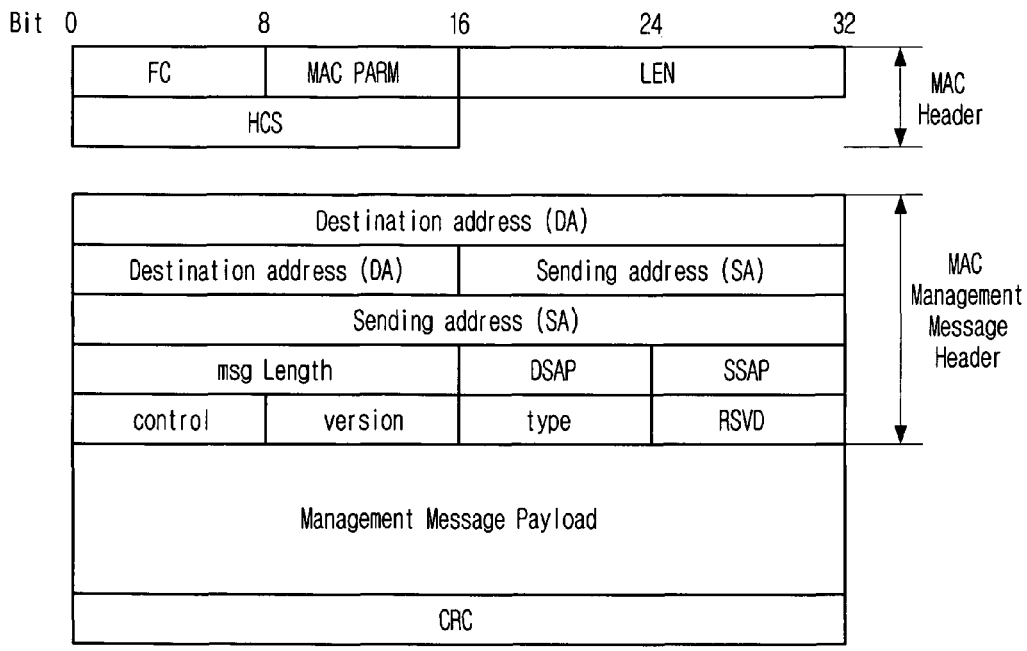
FIG. 5 is a view for explaining a structure of the DOCSIS MAC management message of the apparatus for multimedia data transmission in accordance with an embodiment of the invention.

FIG. 5 is a view for explaining a structure of the DOCSIS MAC management message of the apparatus for multimedia data transmission in accordance with an embodiment of the invention.

The MAC management message is a message for network operation of initialization, registration, and band allocation between the CMTS and the CMs at the MAC layer used in the cable network; and has the form of a final DOCSIS MAC frame with a Logical Link Control (LLC) frame followed by a DOCSIS MAC header.

The DOCSIS MAC management message consists of the DOCSIS MAC header, a DOCSIS MAC management message header, a DOCSIS MAC management message payload and a Cyclic Redundancy Check (CRC).

More specifically, the DOCSIS MAC management message header is composed of "Frame control (FC)", "MAC PARM", "Length (LEN)" and "Header check sequence (HCS)", wherein first two bits of the "FC" field are always "11", which is indicative of the management message, not user data.

The MAC management message header is composed of a Destination Address (DA), a Sending Address (SA), a length of message from Destination Service Access Point (DSAP) to payload, a DSAP set to 0x00, a control set to 0x00, a control set to 0x03, a version and a type of management message between the CMTS and the CMs, and a reserved (RSVD).

The message for DOCSIS MAC management is defined in the management message payload data field.

The CRC is a code for correcting errors in the message and used to compute the payload including the header of DA, SA and so on.

Figure 6:
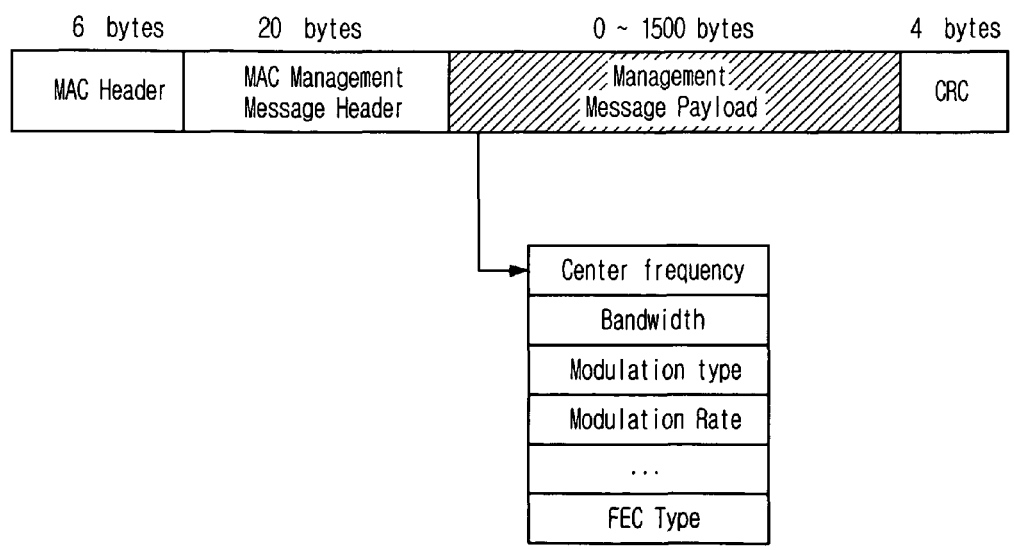
FIG. 6 is a view for explaining an example of the MAC management message structure of FIG. 5.

FIG. 6 is a view for explaining an example of the MAC management message structure of FIG. 5.

The CMTS determines whether a CM includes a function that allows a new physical layer and broadband to be used when it initially operates or restarts.

The determination is made by way of signaling between the CMTS and the CM during the initialization process of the CM. At this time, the signaling message between the CMTS and the CM can be sent through the use of the existing downstream physical layer and band. Thereafter, the CMTS, as shown in FIG. 6, periodically provides information on the new physical layer and broadband depending on the DOCSIS MAC management message standard, thereby enabling a more efficient broadband operation.

The broadband channel management message may contain a center frequency, a transmission bandwidth, a modulation type, a modulation rate, and a channel coding type, e.g., Forward Error Correction (FEC) type, associated with allocated broadband.

By analyzing the information shown in FIG. 6 by the MAC processor 407 of the receiving apparatus, the pattern information 408 of the tuner 404 for receiving the new service band data and the demodulator 405 can be designated.

Figure 7:
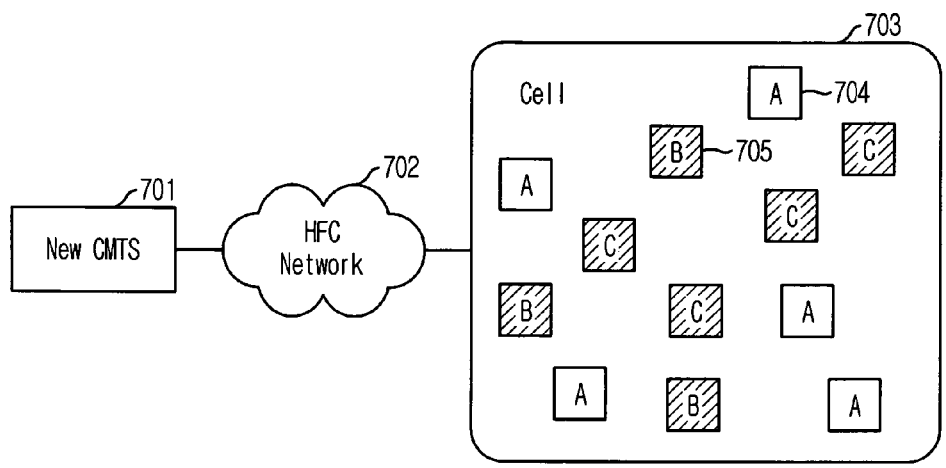
FIG. 7 is a view for explaining the data transmission using the apparatus for multimedia data transmission and reception in accordance with an embodiment of the invention.

FIG. 7 is a view for explaining the data transmission using the apparatus for multimedia data transmission and reception in accordance with an embodiment of the invention wherein transmission network is constructed by using HFC.

When the transmission network is constructed by the HFC 702, there can be existed various types of CMs 704 to 706 together within a same cell 703. The various types of CMs imply that they have reception capability of CMs that can support new standard when transmission method using cable network is newly standardized with the advance of technologies, or use different optical transmission methods that comply with different reception environments of CMs in a same cable transmission company. In this case, the transmission methods that can be used by the CMs become various types such as "A", "B", "C", etc. from the same CMTS 701. Here, the CMs of the groups of "A", "B", and "C" are under different cases in transmission methods that can be used for the additional broadband channel, respectively. In case where an additional transmission bandwidth is assigned to each group to provide a transmission method that coincides with each group by considering the reception environment, there exists a limitation to the frequency resources that can be used in the cable network. Further, in case where a new method is introduced, a new receiver needs an extra cost for implementation of a physical layer to receive the existing band. Accordingly, a need has existed for an effective transmission method that can effectively accommodate both the existing method and the future method and for CMs under different reception environments.

Figure 8:
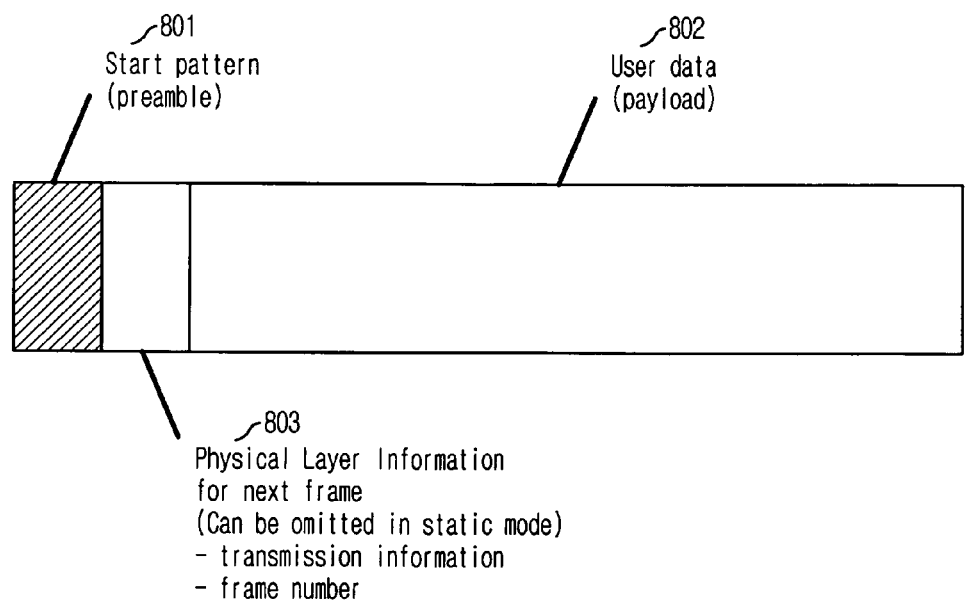
FIG. 8 is a view for describing a basic frame pattern of the physical layer frame based downstream transmission structure of the apparatus for multimedia data transmission in accordance with an embodiment of the invention.

FIG. 8 is a view for describing a basic frame pattern of the physical layer frame based downstream transmission structure of the apparatus for multimedia data transmission in accordance with an embodiment of the invention.

The physical layer frame based downstream transmission structure is a scheme that allows data transmitted for a constant time to be frame at the physical layer to effectively support the transmission method that is compatible with the future new standard or various reception environments of CMs using a single broadband transmission bandwidth.

The physical layer transmission frame contains a start pattern (preamble) 801 indicative of a start of a frame, Physical Layer Information (PLI) 803 denoting a transmission method of the physical layer frame, and user data field (payload) 802.

In the physical layer frame based transmission structure, the transmission method of modulation and demodulation type, channel coding, etc. of the start pattern 801 and the PLI 803 is fixed, so that the receiver can receive it without extra information. But, the transmission method of the user data field 802 may be different in the unit of frame of the physical layer.

Figure 9:
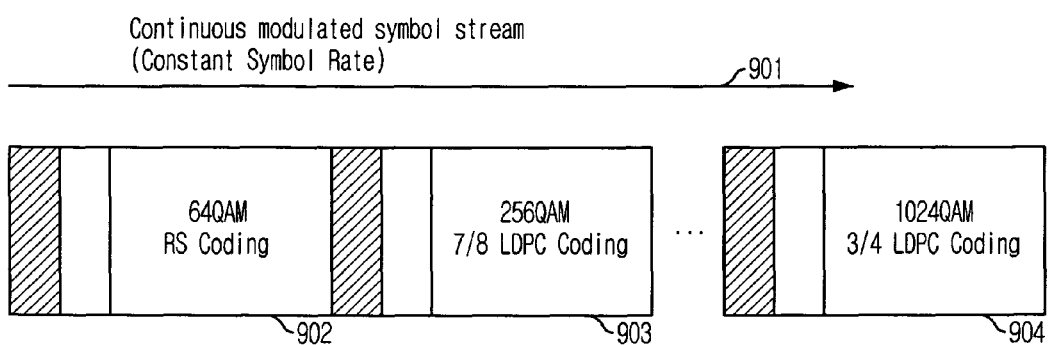
FIG. 9 is a view for describing an example of a continuous physical layer frame structure where the transmission method of the user data field (payload) of FIG. 8 is different.

FIG. 9 is a view for describing an example of a continuous physical layer frame structure where the transmission method of the user data field (payload) of FIG. 8 is different.

Each frame may have a different length, while transmission rate is the same for all frames regardless of the transmission method, wherein the frames are continuously sent, as indicated by reference numeral 901. Therefore, the demodulator can continuously maintain timing synchronization for symbols of modulated signal. At this time, the transmission methods of the user data fields 902 to 904 may be different from each other every physical layer frame.

For example, the physical layer transmission method of the user data region of one frame at a certain time may be 640 QAM and RS coding scheme as given by reference numeral 902, and 256 QAM and 7/8 LDPC coding scheme for next physical layer frame as designated by reference numeral 903. This transmission method for physical layer may be different every frame; and therefore, information on the transmission method of each physical layer frame must be conveyed to the receiver in advance. Thus, the information on the transmission method of each physical layer frame may be given in the information PLI within a previous frame or a frame before some frames.

Figure 10:
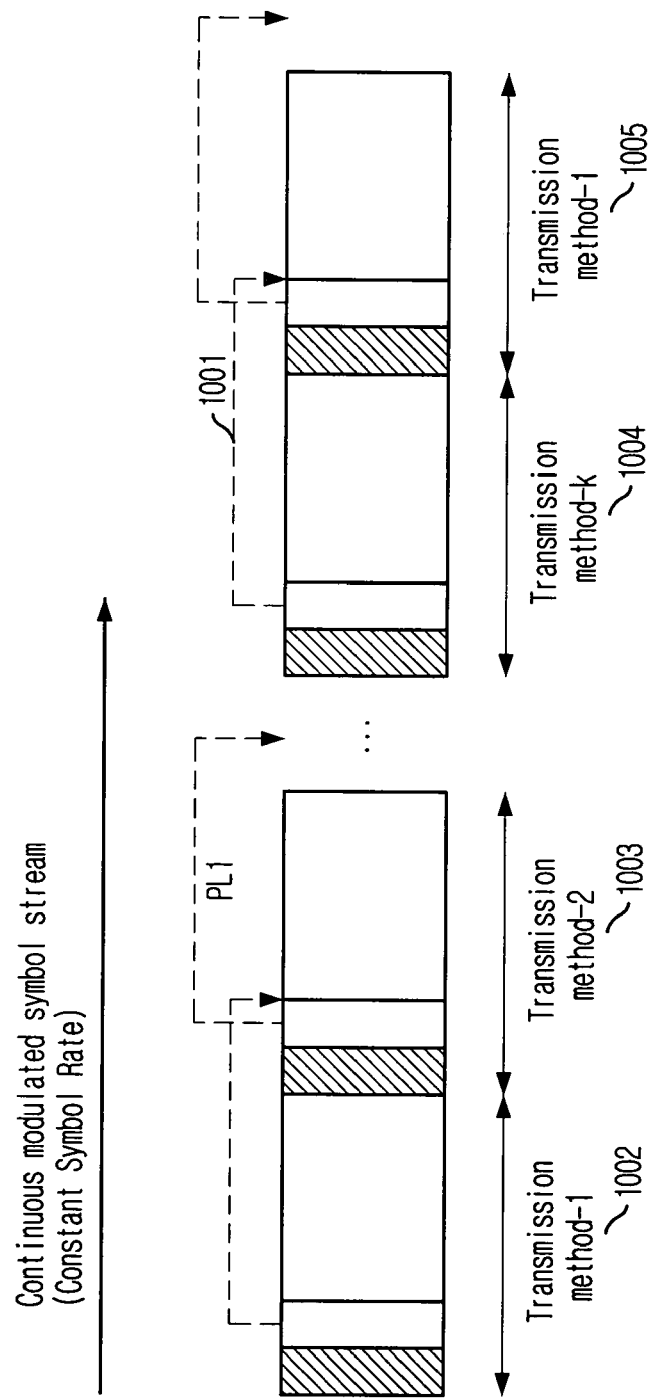
FIG. 10 is a view for describing a dynamic operation mode using the physical layer frame based transmission structure of the apparatus for multimedia data transmission in accordance with an embodiment of the invention.

FIG. 10 is a view for describing a dynamic operation mode using the physical layer frame based transmission structure of the apparatus for multimedia data transmission in accordance with an embodiment of the invention.

The physical layer frame based transmission structure can be generally operated in two modes.

One of such modes is a dynamic operation mode in which the transmission method of physical layer is changed every frame.

In the dynamic operation mode, because the transmission method is changed every frame, the information on the transmission method of each frame must be notified to the receiver in advance at real time.

The information about the transmission method of frame to be received may be indicated in the PLI field of the physical layer frame. Based on the length and transmission speed of frame, it is determined when the information on the transmission method would be notified in advance.

The dynamic operation mode of FIG. 10 is a way that notifies the information on the transmission method of the user data field being currently sent before one frame, as indicated by reference numeral 1001. But, this value may be changed based on implementation of system.

The length of each physical layer frame may be different on a physical layer frame basis.

In FIG. 10, the total symbol number of the physical layer frame of "transmission method-1" given by reference numeral 1002 is "s(1)", and "s(2)" for "transmission method-2".

Figure 11:
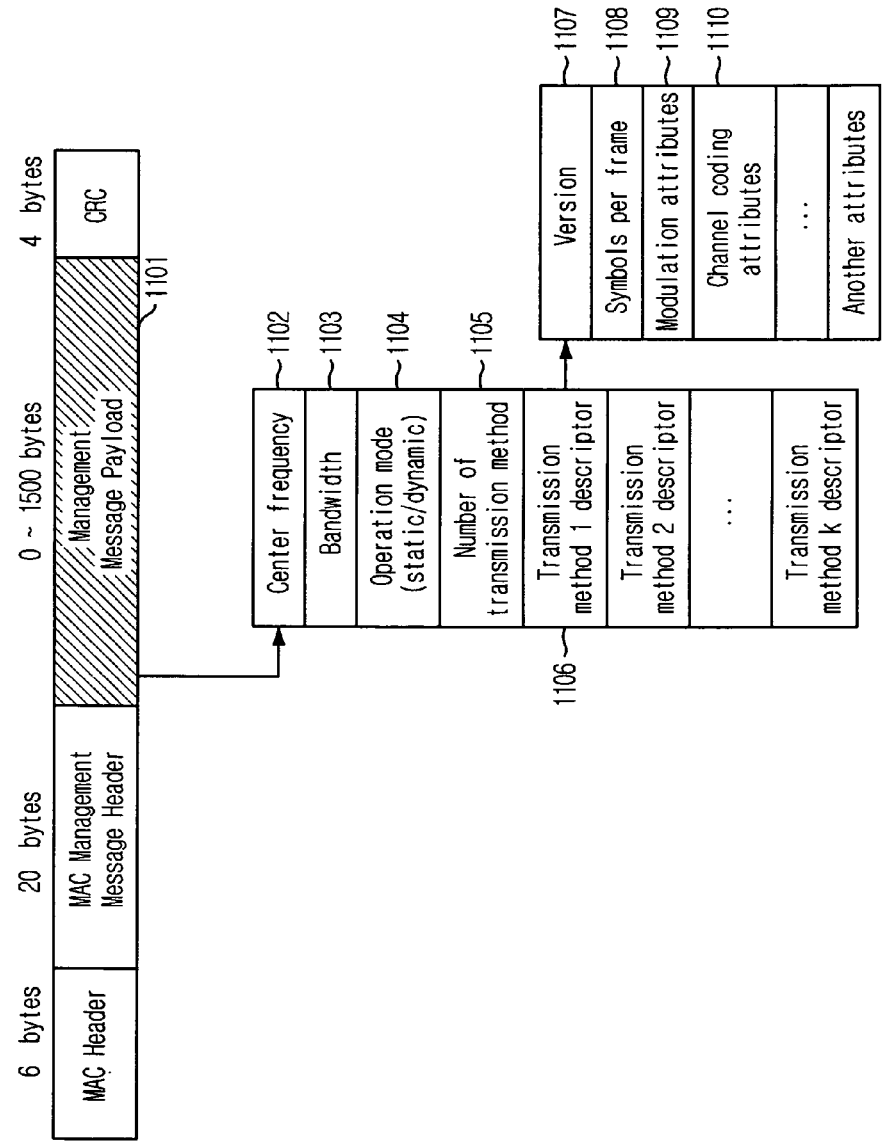
FIG. 11 is a view for describing a management message structure for the physical layer frame based downstream transmission structure of the apparatus for multimedia data transmission in accordance with an embodiment of the invention.

FIG. 11 is a view for describing a management message structure for the physical layer frame based downstream transmission structure of the apparatus for multimedia data transmission in accordance with an embodiment of the invention.

When the transmission structure of the new service band of FIG. 1 is composed of the physical layer frame based structure of FIG. 9, the information on the physical layer frame based structure of the pattern like FIG. 11 and the transmission method is sent in the form of the DOCSIS management message payload 1101 via the existing service channel band of FIG. 1.

The management message for the physical layer frame based structure includes an operation mode 1104 of the physical layer frame based structure, the number of transmission methods 1105, and information on each transmission method 1106, together with basic information of a frequency 1102, a bandwidth 1103, etc. of the additional channel.

Included in the information 1106 on each transmission method are a version 1107 indicative of a change of information on each transmission method, the number of symbols per physical layer frame 1108 of corresponding transmission method, and modulation and channel coding attributes 1109 and 1110.

Figure 12:
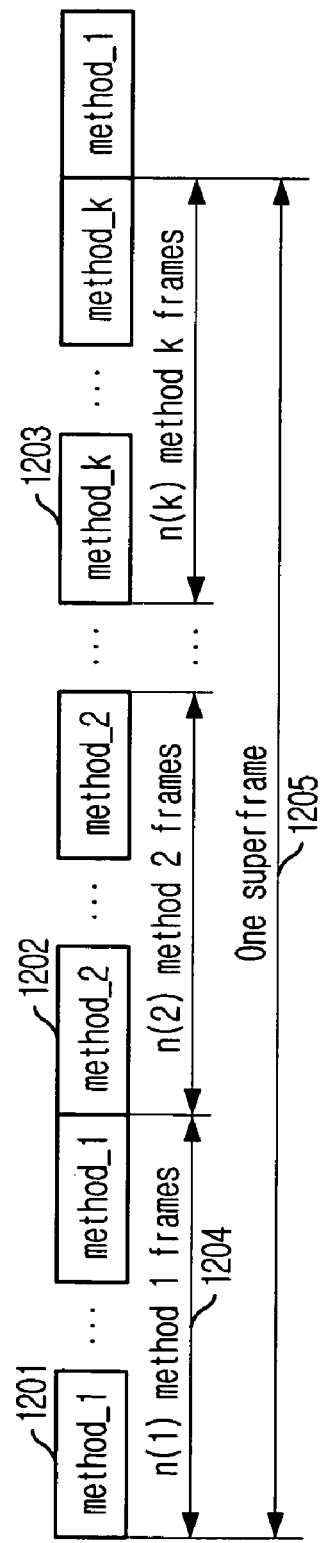
FIG. 12 is a view for describing a static operation mode using the physical layer frame based transmission structure of the apparatus for multimedia data transmission in accordance with an embodiment of the prevention invention.

FIG. 12 is a view for describing a static operation mode using the physical layer frame based transmission structure of the apparatus for multimedia data transmission in accordance with an embodiment of the prevention invention.

The static operation mode is a mode that allocates the required number 1204 of frames by transmission methods 1201 to 1203 of each user data field (payload) and then constructs a super frame 1205 of large unit.

Figure 13:
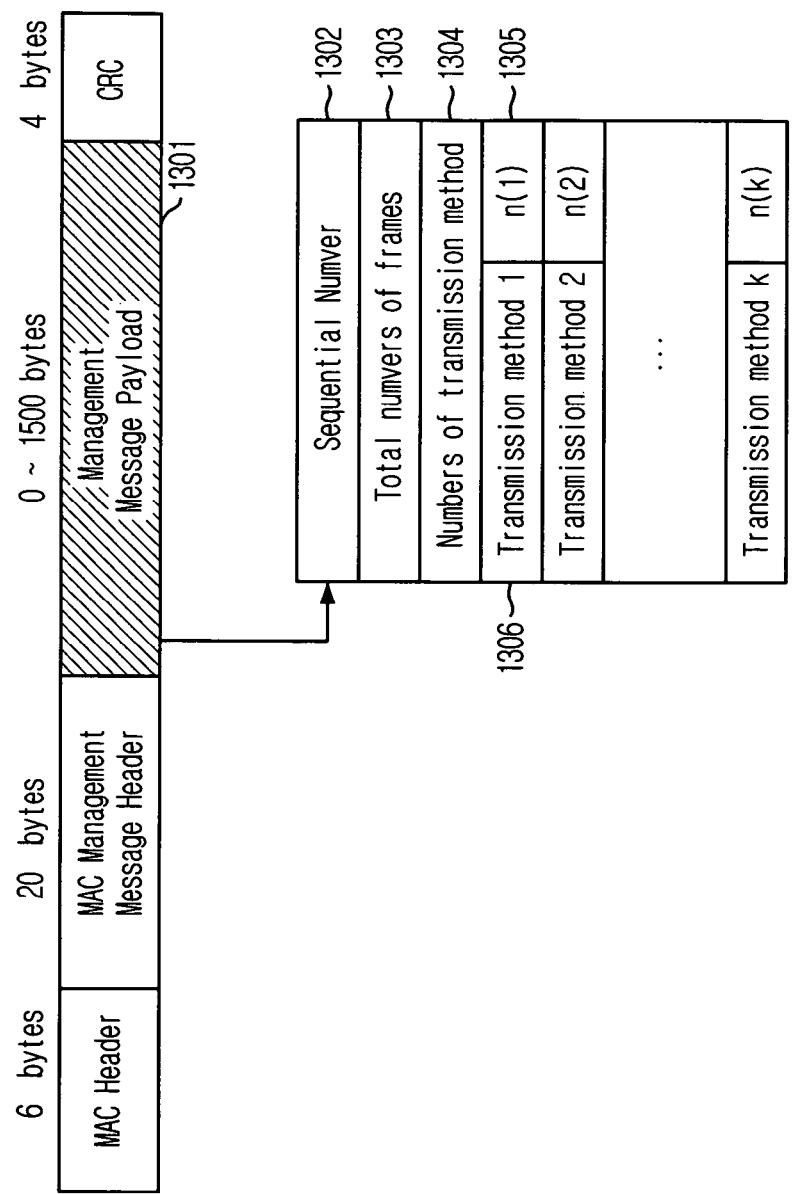
FIG. 13 is a view for describing a management message structure notifying operation information about the construction of the super frame when the physical layer frame based transmission structure of the apparatus for multimedia data transmission in accordance with the invention is operated in the static operation mode.

Information on the super frame 1205 is sent in the form of the DOCSIS management message like FIG. 13 via the existing service channel band 201 of FIG. 2.

In FIG. 12, the super frame includes k transmission methods for different user data fields(payloads), each transmission method being composed of physical layer frames as many as n(1), . . . ,n(k). Here, n(k) denotes the number of physical layer frames of the transmission method k.

In the static operation mode, the transmission method and the number of frames of each method are previously designated in the unit of super frame and information thereon is transmitted in advance; and therefore, the information PLI 803 on the transmitted user data field cannot be contained in each physical layer frame.

FIG. 13 is a view for describing a management message structure notifying operation information about the construction of the super frame when the physical layer frame based transmission structure of the apparatus for multimedia data transmission in accordance with the invention is operated in the static operation mode.

The management message 1301 about the super frame construction for the static operation contains information on a sequential number 1302, a total number of physical layer frames 1303 within the super frame, the number of used transmission methods 1304, and the number of physical layer frames 1305 for each transmission method 1306.

In the management message about the super frame construction, the sequential number 1302 is changed whenever the construction of the super frame is changed and the receiver neglects the management message if the sequential number of received management message is the same as that of the previously received management message.

If the construction of the super frame is changed during operation, information on the change of the super frame construction is sent to the receiver prior to changing the management message of the super frame.

Figure 14:
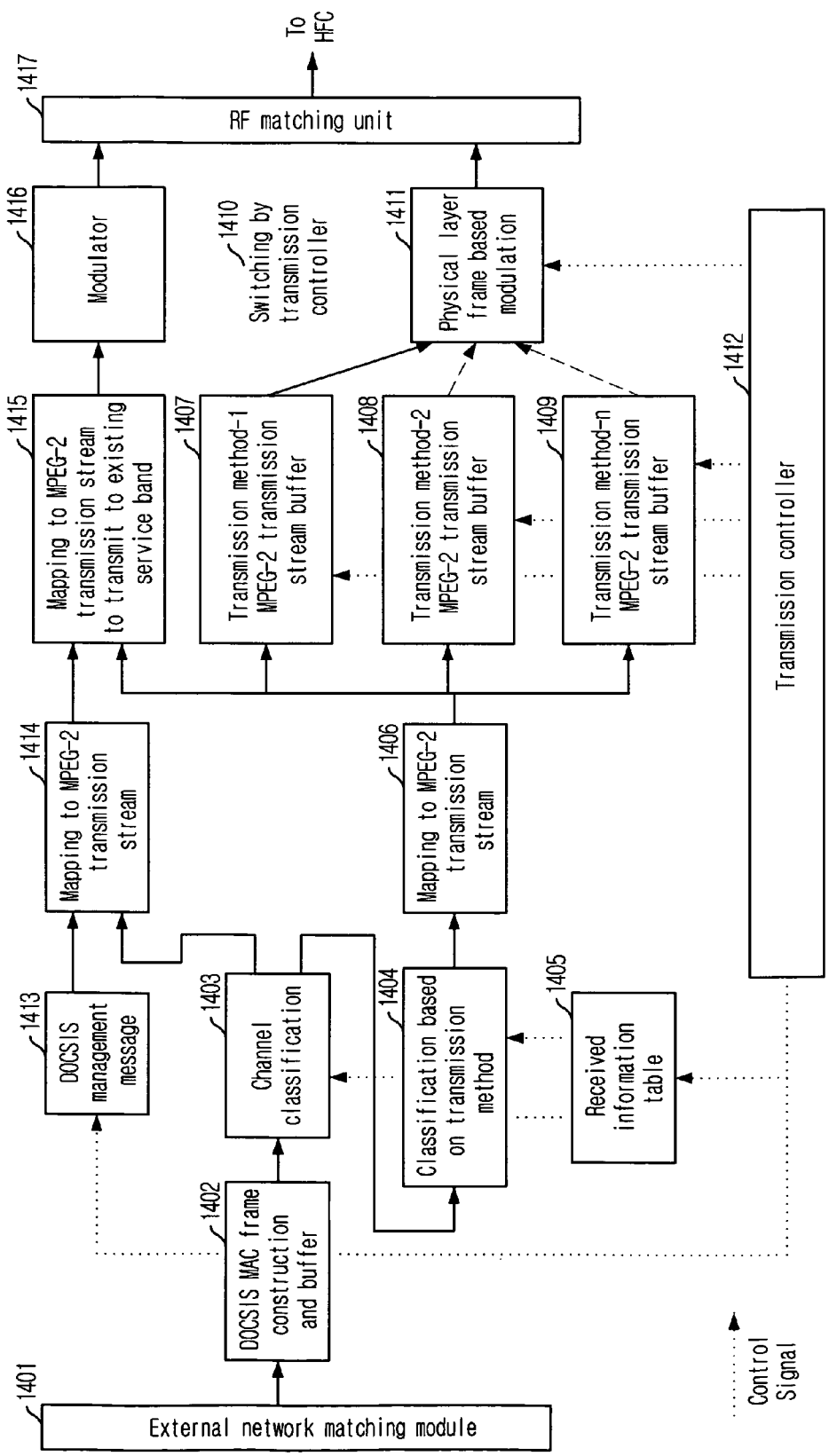
FIG. 14 is a view for describing a method for multimedia data transmission in accordance with an embodiment of the invention.

FIG. 14 is a view for describing a method for multimedia data transmission in accordance with an embodiment of the invention. Especially, FIG. 14 shows a downstream transmission procedure of for the physical layer frame based transmission using a broadband.

A packet inputted from an external network or an internal server is applied to an external network matching module 1401 to extract IEEE 802.3 Ethernet frame. Then, the frame is processed by a DOCSIS MAC frame construction and buffer 1402, in which a DOCSIS MAC frame is constructed and then stored.

Next, each DOCSIS MAC frame is classified into an existing service channel or a broadband transmission channel by referring to a reception information table 1405 received from registered information between the CM and the CTMS during the initialization of the CM depending on an address of transmission destination at a channel classification block 1403. Further, the frame classified into the broadband transmission channel is classified based on a transmission method of physical layer designated in each CM at a block 1404, wherein there is also used the reception information table 1405 received from the registered information between the CM and the CTMS during the initialization of the CM.

The DOCSIS MAC packet classified into the broadband channel transmission is mapped to an MPEG-2 transmission stream at a mapping block 1406, and then stored in MPEG-2 transmission stream buffer 1407, 1408, or 1409 that corresponds to each transmission method.

The MAC frame that conveys the packet or management message 1413 classified into the existing service band is mapped to an MPEG-2 transmission stream like an existing DOCSIS 1. x/2.0 at a block 1414 at a mapping block 1414, and then stored in an MPEG-2 transmission stream buffer 1415 for sending to the existing service band.

A QAM modulator 1416 for the existing service band 201 continuously reads out and transmits the packet stored in the MPEG-2 transmission stream buffer 1415.

If no packet is stored in the MPEG-2 transmission stream buffer 1415, an empty packet is inserted and ITU-T J.83 Annex B is applied as the modulation type for the existing service band.

In case of the physical layer frame based transmission for the broadband channel 202, the packet stored in the MPEG-2 transmission stream buffer 1407, 1408, or 1409 that corresponds to each transmission method is sent according to an operation mode and a band allocation policy of the physical layer frame based transmission structure previously designated by a transmission controller 1412 upon output to a physical layer frame based modulator 1411. Namely, the transmission controller 1412 determines the policy of the dynamic/static operation in advance to transmit in harmonization with the determined operation mode.

In case of the dynamic operation shown in FIG. 10, the buffer of the transmission method to be outputted is selected based on the buffer status and Quality of Service (QoS) information of each current transmission method. And, the transmission mode on the MPEG-2 transmission stream packet provided in the current physical layer frame and the transmission mode on the MPEG-2 transmission stream packet that needs to be sent in the frame later are designated in the physical layer frame based modulator 1411 so that the additional channel modulator constructs a frame that coincides with the physical layer frame structure and then outputs a modulated signal.

In case of the static operation shown in FIG. 12, the transmission controller 1412 selects one of the MPEG-2 transmission stream buffers 1407 to 1409 that corresponds to the transmission method to be outputted depending on the previously designated information on the super frame construction and allows the physical layer frame based modulator 1411 to construct a physical layer frame for the static operation and send a modulated signal.

Figure 15:
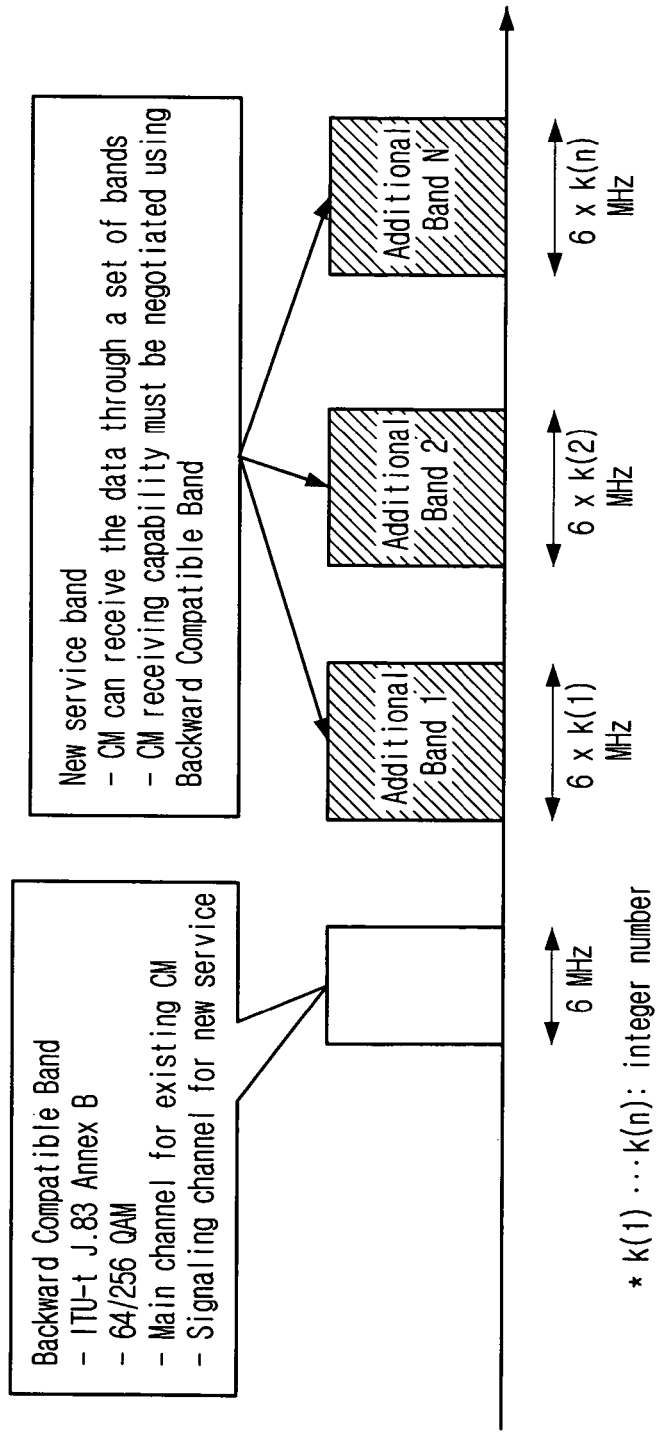
FIG. 15 is a view for describing an example of expanding the broadband transmission structure of the apparatus for multimedia data transmission in accordance with an embodiment of the invention.

FIG. 15 is a view for describing an expansion of the broadband transmission structure of the apparatus for multimedia data transmission in accordance with an embodiment of the invention.

As structures to improve the transmission speed by addition of band, there are the scheme using the two transmission channels as shown in FIG. 2 and further a method expanding to a plurality of transmission channels as exemplified in FIG. 15. That is, the CM can receive a plurality of additional bands, in addition to the basic compatible channels. At this time, the terminal in advance sets the information on the additional bands and the number of broadbands to be used through the management message defined between the CMTS and the CM when the CM is firstly initialized using the basic backward compatible channel as mentioned above. The added bands may be not only the existing 6 MHz band but also any bands.

Figure 16:
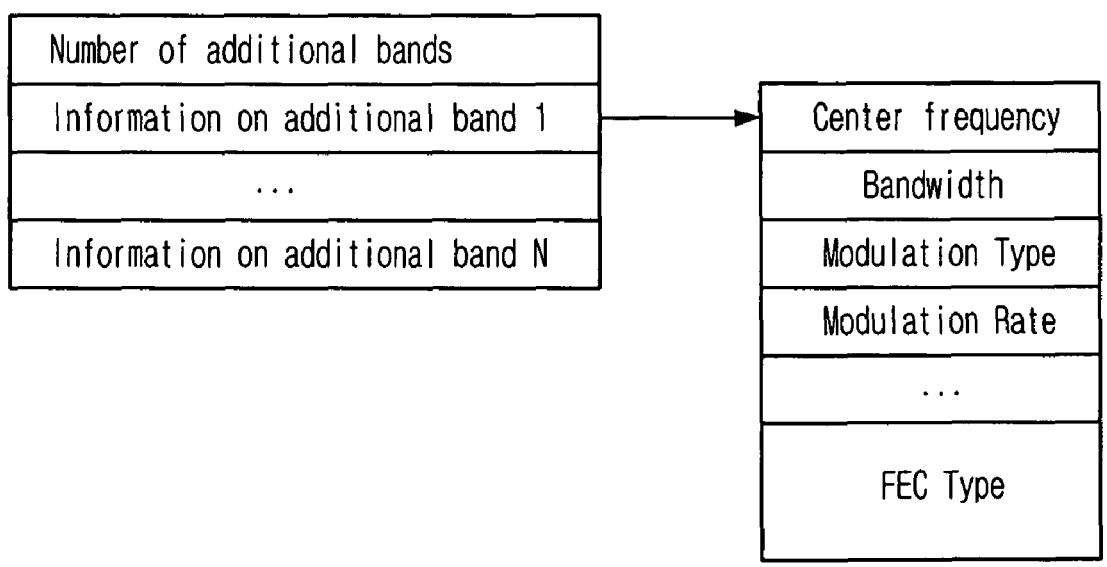
FIG. 16 is a view for describing a pattern of the information message structure of the broadband channel of the apparatus for multimedia data transmission in accordance with an embodiment of the invention

FIG. 16 is a view for describing a pattern of the information message structure of the broadband channel of the apparatus for multimedia data transmission in accordance with an embodiment of the invention.

The broadband channel information message can be readily configured by expanding the DOCSIS management message of the current standard. The transmission methods used for each broadband channel may be some different methods, not a single method. Therefore, the information on the transmission method for each broadband channel is sent in the form of management message over the backward compatible channel.

As described above, the present invention has an advantage in that it provides a transmission method and apparatus for next generation cable network capable of offering backward compatibility to allow existing CMs to receive existing services from cable transmission system developed for introduction of new services. Further, another advantage is that the present invention can facilitate introduction of new technologies to be appeared in the future and effectively provide services into which communications and broadcasting are converged in the future.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-67835, and 2005-123814 filed with the Korean Intellectual Property Office on Jul. 7, 2005, and Dec. 15, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for multimedia data transmission in a cable network between a cable modem termination system (CMTS) and at least one to a plurality of cable modems (CM) using a broadband and physical layer frame structure, comprising:

an external network matching unit for transmitting data inputted or outputted from and to an external network to a Data Over Cable Service Interface Specification (DOCSIS) Media Access Control (MAC) layer;

a DOCSIS MAC processing unit for transmitting the data from the external network matching unit to a corresponding destination;

a first downstream physical layer processing unit for handling an existing standard transmission in the data from the DOCSIS MAC processing unit;

a second downstream physical layer processing unit for dealing with a new broadband transmission in the data from the DOCSIS MAC processing means; and an upstream physical layer processing unit for providing received data to the DOCSIS MAC processing unit, wherein the new broadband transmission of data is transmitted simultaneously with the existing standard transmission of data, wherein the existing standard transmission of data is a single transmission band, wherein the new broadband transmission of data is one or more transmission bands, wherein the new broadband transmission of data is transmitted based on a negotiation from the transmission of the existing standard transmission of data in the single transmission band to an existing cable modem (CM), wherein the negotiation is configured to determining by way of signaling between the CMTS and each of the at least one to the plurality of CMs during an initialization process of each of the at least one to the plurality of CMs whether each of the at least one to the plurality of CMs is the existing CM or a new CM, wherein the existing CM receives the existing standard transmission in the data from the DOCSIS MAC processing unit, and wherein the new CM receives the new broadband transmission in the data from the DOCSIS MAC processing unit.

2. The apparatus as recited in claim 1, wherein the DOCSIS MAC processing unit performs a function of supporting a downstream broadband physical layer in addition to an existing DOCSIS MAC processing function, and transmits, upon transmission of data received from an external network or service providing unit in a headend, user data and management message data using the first downstream physical layer processing unit if a destination of the data is the existing Cable Modem (CM) and all user data using the second downstream physical layer processing means via a broadband if a destination of the data is the new CM.

3. The apparatus as recited in claim 2, wherein the management message data is transmitted from the DOCSIS MAC processing unit using the first downstream physical layer processing unit or to all of the first and the second downstream physical layer processing unit and has a final DOCSIS MAC frame pattern in which a DOCSIS MAC header is added to a Logical Link Control (LLC) frame as a message for network operation of initialization, registration and band allocation between a transmitter and a receiver at a MAC layer used in the cable network, the management message data including the DOCSIS MAC header, a DOCSIS MAC management message header, a DOCSIS MAC management message payload and a Cyclic Redundancy Check (CRC).

4. The apparatus as recited in claim 3, wherein the DOCSIS MAC management message header includes "Frame control (FC)", "MAC PARM", "Length (LEN)" and "Header Check sequence (HCS)", and first two bits of the FC field are always "11", which is indicative of a management message not user data.

5. The apparatus as recited in claim 3, wherein the MAC management message header contains a Destination Address (DA), a Sending Address (SA), a length of message from Destination Service Access Point(DSAP) to payload, a DSAP set to 0x00, a Source Service Access Point(SSAP) set to 0x00, a control set to 0x03, a version and a type of the management message between Cable Modem Termination System (CTMS) and CM, and a reserved (RSVD).

6. The apparatus as recited in claim 3, wherein the management message payload of which a message for DOCSIS MAC management is defined in the data field, and contains information on a center frequency, a transmission bandwidth, a modulation type, a modulation rate and a channel coding mode.

7. The apparatus as recited in claim 3, wherein the user data is sent via one physical layer and the one transmission band that are determined by the DOCSIS MAC processing unit based on a destination of the CM.

8. An apparatus for multimedia data reception in a cable network using a broadband and physical layer frame structure, comprising:

a first downstream physical layer receiving unit for handling an existing physical layer scheme;

a second downstream physical layer receiving unit for dealing with a broadband physical layer scheme;

a DOCSIS MAC processing unit for processing data received by the first and the second downstream physical layer receiving unit; and an upstream physical layer transmitting unit for transmitting the data, wherein the second downstream physical layer receiving unit receives data simultaneously with data received from the first downstream physical layer receiving unit, wherein the first downstream physical layer receiving unit receives data from a single transmission band, wherein the second downstream physical layer receiving unit receives data from one or more transmission bands, and wherein the second downstream physical layer receiving unit receives data based on the negotiation from the reception of the first downstream physical layer receiving unit receiving data in the single transmission band from a new cable modem termination system (CMTS), wherein the negotiation is configured to determining by way of signaling between the CMTS and the apparatus during an initialization process of the apparatus how the second downstream physical layer receiving unit deals with the broadband physical layer scheme.

9. The apparatus as recited in claim 8, wherein the first downstream physical layer receiving unit includes:

a first tuning unit for receiving an existing service band;

a first demodulating unit for demodulating data provided by the first tuning unit; and a first MAC frame extracting unit for extracting a DOCSIS MAC frame from MPEG-2 transmission stream data outputted from the first demodulating unit.

10. The apparatus as recited in claim 8, wherein the second downstream physical layer receiving unit includes:

a second tuning unit for receiving a new broadband signal;

a second demodulating unit for demodulating data provided by the second tuning unit; and a second MAC frame extracting unit for extracting a DOCSIS MAC frame from MPEG-2 transmission stream data outputted from the second demodulating unit.

11. The apparatus as recited in claim 8, wherein the information on an initial additional broadband channel is acquired from the existing service band and it is judged whether the broadband channel is available based on the acquired information on the broadband channel, in which if available, configuration information of the second tuning unit and the second demodulating unit for new service band is designated and the user data is received via the broadband channel.

12. A method for multimedia data transmission in a cable network between a cable modem termination system (CMTS) and a cable modem (CM) using a broadband and physical layer frame structure, comprising the steps of:
   (a) extracting a packet inputted from an eternal network or an external network via an internal server and an Ethernet frame from an external network matching module, constructing a DOCSIS MAC frame using the extracted ones, and storing the DOCSIS MAC frame in a DOCSIS MAC frame buffer;
   (b) classifying the DOCSIS MAC frame stored in said step (a) into an existing service channel or a broadband transmission channel by referring to a reception information table received from registered information between the CM and the CMTS during an initialization of the CM depending on an address of transmission destination;
   (c) classifying the frame classified into the broadband transmission channel in said step (b) based on a physical layer transmission mode designated in each CM, mapping the DOCSIS MAC packet classified into the broadband channel transmission to an MPEG-2 transmission stream, and storing the mapped data in an MPEG-2 transmission stream buffer of each transmission mode;
   (d) mapping the MAC frame that transmits the packet or management message classified into the existing service band in said step (b) to an MPEG-2 transmission stream like an existing DOCSIS 1.x/2.0, and storing the mapped data in an MPEG-2 transmission stream buffer for sending to the existing service band;
   (e) transmitting the packet stored in said step (c) depending on an operation mode and a band allocation policy of a predetermined physical layer frame based transmission structure at a transmission controller, and modulating the packet at a physical layer frame based modulator; and
   (f) modulating the packet stored in said step (d),
   wherein the physical layer frame structure allows data transmitted for a predetermined time of a frame at a physical layer to support a transmission mode of the existing service channel or the broadband transmission channel that coincides with each of the respective CM,
   wherein the broadband transmission channel is transmitted simultaneously with the existing service channel,
   wherein the existing service channel of data is transmitted as a single broadband transmission band,
   wherein the broadband transmission of data is transmitted as one or more broadband transmission bands, and
   wherein the broadband transmission of data is transmitted based on the negotiation from the transmission of the existing service channel of data in the single broadband transmission band to an existing CM,
   wherein the negotiation is configured to determining by way of signaling between the CMTS and the CM during the initialization whether the CM is an existing CM or a new CM,
   wherein the existing CM receives the packet associated with the existing service channel of data, and
   wherein the new CM receives the packet associate with the new broadband transmission of data.

13. The method as recited in claim 12, wherein said step (c) utilizes a reception information table received from registered information between a CM and a CTMS during the initialization of the CM.

14. The method as recited in claim 12, wherein if no packet is stored in the MPEG-2 transmission stream buffer, said step (d) inserts an empty packet.

15. The method as recited in claim 12, wherein, in case of a dynamic operation, said step (e) selects a buffer of transmission mode to be outputted using a current buffer status and Quality of Service (QoS) information of each transmission mode and designate a transmission mode on an MPEG-2 transmission stream packet provided in a current physical layer frame and a transmission mode on an MPEG-2 transmission stream packet to be sent in a next frame in the physical layer frame based modulator so that an additional channel modulator constructs a frame that coincides with the physical layer frame structure and outputs a modulated signal; and in case of a static operation, said step (e) allows the transmission controller to select an MPEG-2 transmission stream buffer of transmission mode to be outputted based on construction information of a preset super frame and also the physical layer frame based modulator to construct a physical layer frame for the static operation and transmit a modulated signal.

16. The method as recited in claim 12, wherein said step (f) substantially applies ITU-T J.83 Annex B as the modulation mode for the existing service band and a QAM modulator for the existing service band continuously reads out and sends the packets stored in the MPEG-2 transmission stream buffer.

17. The method as recited in claim 12, wherein the physical layer transmission frame contains a start pattern (preamble) indicative of a start of a frame, Physical Layer Information (PLI) denoting a transmission mode of the physical layer frame, and a user data field (payload); and, in the physical layer frame based transmission structure, the transmission mode of the modulation and demodulation mode and channel coding of the start pattern and the PLI information is fixed so that a receiver receives without separate information, the user data field transmission mode being different every physical layer frame.

18. The method as recited in claim 17, wherein a dynamic operation is made in such a way that the physical layer transmission mode is changed every frame, the information on the transmission mode of the frame is provided to the receiver in advance of the packet of data for the changed frame being received at real time, the information on the transmission mode of frame to be received is shown in the PLI information field of the physical layer frame, and the information on the transmission mode is notified based on the length and transmission speed of the frame before a predetermined frame.

19. The method as recited in claim 18, wherein the dynamic operation employs the management message that is sent in the form of DOCSIS management message payload via an existing service channel band and contains the operation scheme of the physical layer frame based structure, the number of transmission modes, and information on each transmission mode together with basic information having a frequency and a bandwidth of an additional channel, said information on each transmission mode including a version indicative of a change of the information on the transmission mode, the number of symbols per physical layer frame of the corresponding transmission mode, and information on the modulation and demodulation and coding mode.

20. The method as recited in claim 17, wherein the static operation is a scheme that constructs and manages a super frame of large unit by allocating a required number of frames for each transmission mode of each user data field, and the information on the super frame is sent in the form of the DOCSIS management message via the existing service channel band.

21. The method as recited in claim 20, wherein the super frame has a predetermined number of transmission modes for different user data fields and is composed of a predetermined number of physical layer frames for each transmission mode; and the management message on the super frame construction contains a sequential number, a total number of physical layer frames in the super frame, the number of used transmission modes and information on the number of physical layer frames for each transmission mode, the sequential number of the management message on the super frame construction being changed whenever construction of the super frame is changed, and the receiver neglects the management message if the sequential number of the received management message is the same as that of previously received management message, and the information on the construction change of the super frame is sent in the form of the management message before change of the management message of the super frame if the construction of the super frame is changed during the operation.

22. The method as recited in claim 17, wherein it is possible to expand to a plurality of transmission channels, the CM receives a plurality of bands in addition to basic compatible channels, and the terminal previously designates the information on the additional bands and the number of broadbands to be used using the basic backward compatible channels through the management message defined between the CM and the CTMS when the CM is firstly initialized.

* * * * *